Feb. 6, 1951 R. H. RILEY, JR., ET AL 2,540,174
BATTERY TESTING AND CHARGING APPARATUS
Filed Oct. 12, 1946
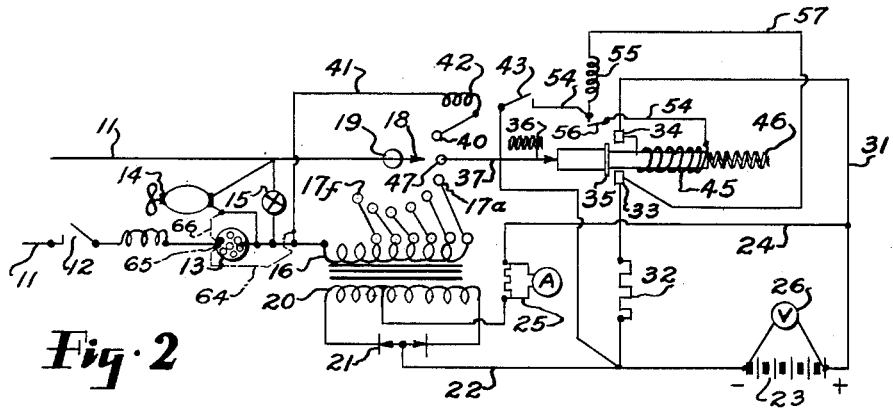
Fig. 2
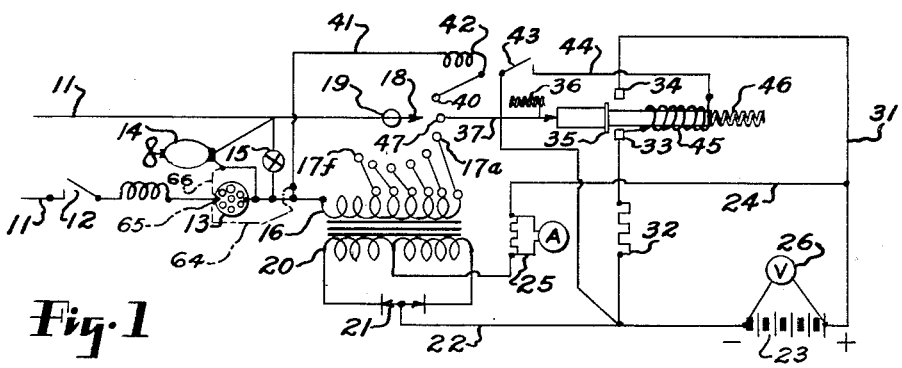
Fig. 1
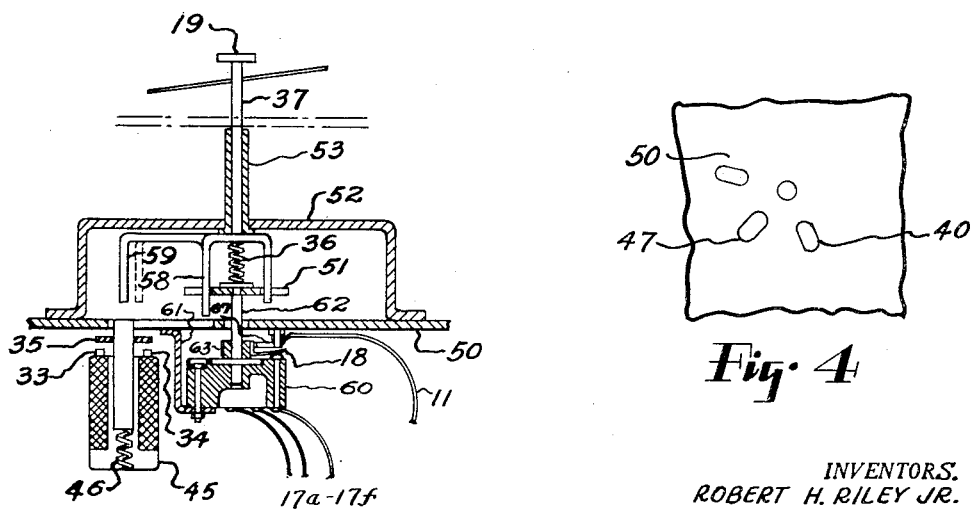
Fig. 3
Fig. 4
INVENTORS.
ROBERT H. RILEY JR.
THOMAS W. HOLLAND
BY
Fay Kolrick & Fay
ATTORNEYS Patented Feb. 6, 1951

2,540,174

UNITED STATES PATENT OFFICE 2,540,174

BATTERY TESTING AND CHARGING APPARATUS

Robert H. Riley, Jr., and Thomas W. Holland, Towson, Md., assignors to The Black & Decker Manufacturing Company, Towson, Md., a corporation of Maryland Application October 12, 1946, Serial No. 702,936

4 Claims. (Cl. 320—48)

This invention relates generally to servicing apparatus for automobile storage batteries. More particularly it has reference to the electrical circuits and controls concerned with the testing, desulphation, and quick charging of batteries.

The primary object of the invention is to provide simplification and increased reliability in charging apparatus by providing improved means whereby a battery to be serviced may first be tested and, when required, prepared for charging by quick discharge and desulphation.

A further object of the invention is to provide testing and discharge circuits which may be used separately and distinctly from the charging circuit, yet which in certain phases cooperate with the latter.

Another object is to provide in the servicing apparatus an auxiliary A.-C. circuit which may be used in direct conjunction with the discharge circuit as more fully described below.

A still further object is to provide a system of battery discharging, testing and charging circuits which may be controlled by a single manually operable means so arranged as to prevent mistakes in circuit hook up.

To accomplish these and related objects, there are provided certain improved structural details and circuit arrangements as are diagrammatically illustrated in the accompanying drawings wherein:

Fig. 1 is a diagrammatic outline of key structure and pertinent electrical circuits in the preferred form of the invention; and Fig. 2 is a diagrammatic outline of a modification of the invention including an additional, sensitive, secondary control circuit;

Fig. 3 is a mechanical diagram of an error preventing manual control and selecting switch means for setting the circuits of the apparatus; and Fig. 4 is a fragmentary plan view of part of a panel associated with the manual control means shown in Fig. 3.

Before referring to the drawings in detail, it may be well to state that the structure and circuit shown and described are, of course, housed in a suitable, enclosed case, mounted on wheels so that it can conveniently be moved about. Such a housing is of the normal kind used for battery servicing, having a panel and selector controls, indicator light and the like. Since the invention resides primarily in the internal arrangement of the servicing circuits, little further need be said about the exterior except that which will be obvious from the description below.

For the sake of clarity the component parts of the apparatus can best be described in the circuits in which they are used.

In Fig. 1, as a part of the primary A.-C. circuit, is a source of alternating current 11 having a main line switch and circuit breaker 12 and a timer-switch mechanism 13. A motor and fan 14 are provided for cooling the entire servicing apparatus. Connected with the timer is a panel and signal light 15 used in conjunction with discharging and charging. When the timer is in the off position, the signal light and all A.-C. circuits are open. Also in the A.-C. circuit is a primary transformer winding 16 with a series of taps 17 and a movable tap switch 18, together with the latter's manual control knob 19.

In the secondary or battery charging direct current circuit there is a secondary transformer winding 20 with its rectifier 21 and negative line 22 running to the battery 23 with its return line 24, connected in which is a shunt ammeter 25. A voltmeter 26 is provided across the battery terminals so that the condition of the battery may be ascertained. There is another secondary circuit, which we have designated a test-discharge circuit to be used for an initial determination of the condition of the battery. In this circuit 31, which shares certain lines in common with the battery charging circuit above described, there is a discharge resistor element 32 and terminals 33 and 34 of a solenoid switch having a contact bar 35 on the solenoid armature. The solenoid armature may be moved to bring bar 35 into contact with these terminals against the action of a spring 46 by manually moving control knob 19 and its connecting rod 37 to point 47 and then depressing the knob against spring 36. When this test discharge circuit 31 is closed momentarily, a reading of the voltmeter 26 will determine the condition of the battery.

When a sulphated condition is indicated a quick discharge is given the battery. In bringing about this quick discharge two circuits are employed. First, circuit breaker or main line switch 12 is closed and timer switch 13 is set to an "on" position, then control knob 19 is manually moved to contact point 40 which closes auxiliary A.-C. circuit 41 to energize a relay coil 42 operating a switch 43 for closing discharge control circuit 44 in the secondary. This control circuit 44 includes a relay coil 45 for holding the switch or contact 35 automatically closed, thus closing discharge circuit 31 until the battery potential is reduced to a predetermined minimum at which point the relay coil 45 has insufficient energy to hold contact bar 35 closed against the action of spring 46. When this occurs, discharge circuit 31 will automatically open. In addition to closing the auxiliary A.-C. circuit 41 and the control circuit 44 as described above, control knob 19 must be manually depressed in order that contact bar 35 will be positioned against terminals 33 and 34, thereby closing the discharge circuit as described below. When both these preliminary requirements have been made, the magnetism in the relay coil 45 will hold contact bar 35 against the terminals 33 and 34, thereby holding the discharge circuit closed until such time as the battery potential is reduced to the predetermined minimum and thus weakening the action of said relay coil 45 and allowing the action of spring 46 to open the discharge circuit. It should be clear from the foregoing that while the action of this discharge circuit is initiated by the manual depression of control knob 19 as one of the requirements for discharge, the control knob 19 need not be held down because the control circuit 44 will maintain the closure of the discharge circuit by the magnetism of relay coil 45 after contact bar 35 has once been placed against the terminals 33 and 34. It will be noted that switches 33—34—35 can be closed manually at two different positions 47 and 40 of tap switch 18, but it must be held closed manually in the first instance and is held closed by A.-C. circuit dominance in the second instance. When this switch is manually closed by depression of the control knob 19 at position 47 none of the secondary circuits, except the test discharge circuit, functions.

An alternative form of hook-up for auxiliary A.-C. circuit 41 is indicated by the dotted connection 64 in Figs. 1 and 2. In this form the auxiliary A.-C. circuit 41 is connected into the primary A.-C. circuit to the left of the timer at 65. This arrangement permits activation of the auxiliary A.-C. circuit 41 and discharge control circuit 44 (54 in Fig. 2) without the necessity of traverse through the timer 13. In this form discharge can be effected by closure of main line switch 12, together with the required depression of control knob 19 and movement of the tap switch to contact point 40. Since it is important that fan motor 14 be on when discharge is taking place, in this alternate form the fan motor will also be connected to point 65 is indicated by the dotted line 67.

In the modified form of my invention as diagrammatically illustrated in Fig. 2 of the drawing, an additional sensitive secondary control circuit has been provided. Connected with the primary discharge control circuit, which in the modification is given the reference numeral 54, is an additional control circuit 57. When primary control circuit 54 is closed by the action of the relay 42 and switch 43 as above described, relay coil 55 in sensitive, secondary control circuit 57 will effect closure of the primary discharge control circuit through switch 56 when control knob 19 is depressed. This additional secondary control circuit 57 is connected from the side of the primary control circuit 54 to the other side at contact 33 and thus acts as a sensitive circuit breaker and circuit opening means since, when the battery potential drops to a predetermined minimum, relay coil 55 will no longer be able to maintain switch 56 in a closed position and primary control circuit 54 will then be broken. With the opening of the primary control circuit 54, relay coil 45 will be deenergized and spring 46 will lift contact bar 35, thus opening the discharge circuit 31. It is intended that relay coil 55 will act as a more sensitive circuit breaker for certain types of battery servicing than will the standard, less sensitive relay coil 45.

In Figs. 3 and 4 we have shown a mechanical representation, in a more or less diagrammatical manner, of the elements comprising the single knob operating means for setting the primary side of the transformer and for setting the secondary circuits. The mechanism is such that the solenoid switch cannot be closed except at the positions 40 and 47. This mechanism is supported by, and associated with, an inner structural panel 50, and now will be described.

The control knob shaft is revolubly and axially shiftably supported by a bracket 52 and a bearing tube 53 fixed to the bracket. The inner end of the shaft 37 is fork-shaped with the legs of the fork formation disposed in slots formed in a disk 51 secured to one end of a switch shaft 62. One leg 58 of the fork is longer than the other and is adapted to prevent depression of the knob 19 and its shaft 37 except when the leg 58 registers with either of two openings 40 or 47 formed in the panel 50. A third leg 59 of the fork formation is adapted to project through an opening in panel 50 and depress the solenoid armature of solenoid mechanism 45 against the force of the armature spring 46, which tends to maintain the solenoid switch 33—35—34 normally open. Since the position of the solenoid 45 is fixed, two legs 59 are provided and spaced to conform with 40—47. The solenoid mechanism may be supported on the panel 50 by any suitable bracket means, not shown.

Disposed between the end of the knob shaft 37 and the disk 51 is the spring 36 which tends to maintain the knob 19 and its shaft 37 normally outward, as shown in Fig. 3. The tap switch mechanism for the primary coils and the contacts 40—47 may be combined in an insulated contact barrel 60 which is rigidly supported by a bracket 61 secured to panel 50. The contact barrel may also constitute a bearing for the switch shaft 62. The switch shaft may carry an insulated contact sleeve 63, of which the switch arm 18 is an integral part. A suitably mounted flat spring brush 67 comprises the connection of the A.-C. line 11 to the switch arm 18.

Proceeding now to the operation of our battery servicing apparatus, battery 23 should first be connected up in the normal fashion. Then the battery may be tested by the manual depression of the control knob 19, with the tap switch 18 and fork leg 58 at position 47 and the condition of the battery determined by a reading of the voltmeter 26.

Before proceeding to the discharging of the battery for desulphation when necessary, in preparation for subsequent charging, primary A.-C. circuit 11 will be closed by the activation of main line switch 12. The fan, signal light and auxiliary A.-C. circuit 41 will not be energized, however, until the timer mechanism 13 is set to some time selected "on" position.

In the alternative form of hook-up for auxiliary A.-C. circuit 41 as indicated by the dotted lines 64 and described above, provision is made for activation of this circuit for discharge purposes without employment of the timer relay 13 merely by closing main line switch 12.

Reviewing in functional terms what has been indicated above in the brief description as to discharging, control knob 19 will first be manually moved to contact point 40, thereby closing the auxiliary A.-C. circuit 41 which, in turn, will effect closure of the primary control circuit 44 of Fig. 1 by action of the relay coil 42 and the consequent closing of switch 43. Together with the moving of control knob 19 to contact point 40, control knob 19 must be manually depressed, thereby moving connecting rod 37 against the action of spring 36 to place contact bar 35 across the terminals 33 and 34. Closing of the primary control circuit 44 and the discharge circuit 31 by contact bar 35 establishes a circuit from the battery 23 through discharge resistor 32. The battery current through the primary control circuit will energize relay coil 45, thereby maintaining automatic closure of contact bar 35 when control knob 19 is released. When the battery voltage drops, due to discharge, to some desired and predetermined value, current through the primary control circuit will be sufficient to keep relay coil 45 energized to a degree which will maintain closure of contact bar 35 against the terminals 33 and 34 in opposition to the action of spring 46. When this occurs, action of spring 46 will open the discharge circuit.

In the modified form shown in Fig. 2, the same procedure for discharge must be followed, but here, when the auxiliary A.-C. circuit is closed to effect closure of switch 43 and primary control circuit 54, the current through the secondary control circuit 57 will energize relay coil 55, closing switch 56 (normally open) and control circuit 54 which energizes relay coil 45 in discharge circuit 31 and holds contact bar 35 closed when control knob 19 is released. When the battery voltage across discharge resistor 32 has dropped, due to discharge, to a predetermined value, sensitive relay coil 55 will then have insufficient energy to maintain switch 56 in a closed position and hence the primary control circuit 54 will be opened, thereby breaking the holding action of relay coil 45 and allowing contact bar 35 to open and break the discharge circuit.

It will also be apparent that discharge may be terminated prior to the time the predetermined discharge condition would normally be reached in the control and discharge circuits through the action of discharge resistor 32 by other means. If control knob 19 is moved from contact position 40 the auxiliary A.-C. circuit 41 will be open, deenergizing relay coil 42 and opening switch 43, thereby in turn deenergizing relay coil 55 and opening the primary control circuit 54 at switch 56, with the obvious effect upon relay coil 45 and contact 35. This mode of termination also applies to the hook-up in Fig. 1 through circuit 44.

Once the battery to be serviced has been tested and discharged for desulphation when required, to a desired point, it will then be in a condition for charging. By use of movable tap switch 18, the initial charging rate to be given the battery may be selected by positioning control knob 19 against any one of the selector positions 17a, 17b, 17c, 17d and 17f. The various selectable positions 17 represent various number of turns in the transformer primary 16. The low voltage alternating current from the transformer secondary 20 is converted to direct current by the rectifier 21 and connected to the terminals of the battery 23. Voltmeter 26 is also connected to the terminals of the battery. Shunt ammeter 25, provided in the line 24 of the battery charging circuit, indicates the charging current.

It will be noted that the timer mechanism and the signal light can be used to indicate the end of a discharge period as well as to indicate the end of a charging period. When this is done the auxiliary A.-C. circuit 41 will be open and also the light circuit 15 will be open until the timer is turned to an "on" position. The timer can be turned to an "on" position corresponding to, say five minutes, and then the operator can tell when the discharge is discontinued as the light will be out as soon as the five minutes are up. Generally the solenoid will have opened in a shorter time due to the voltage in coil 45 being decreased, but in case the coil did not drop it out the timer would in a short enough time so that there would be no damage to the battery. The operator can always make a check by the voltmeter to determine whether the battery was sufficiently discharged. This arrangement makes it possible for the operator to be doing something else and not have to stand and watch the machine. Through the mechanical lock out arrangement disclosed the control knob 19 can be depressed only when it is turned to contact positions 40 and 47 on tap switch 18.

By having the manually operated tap switch 18 and control knob 19 coordinated in the manner described and the auxiliary A.-C. circuit 41 arranged as indicated by the dot and dash lines, the apparatus cannot be misused, for at no time can the primary side of the transformer be energized while the testing and discharging circuits are being used, since the timer switch will be open in this instance.

Although we have described but one form of the invention, it is understood that other forms might be adopted, all falling within the scope of the claims, as follows.

We claim:

1. In an apparatus for servicing storage batteries, a primary A. C. circuit including a tapped primary winding of a transformer; a battery charging circuit including the secondary of the transformer and a rectifier; a selector control switch in the A. C. circuit for varying the windings used in the primary of the transformer, said selector switch having for battery test and discharge purposes two selector positions whereat the switch is neutral with respect to the primary windings; a normally open battery test and discharge circuit connected across the output of the battery charging circuit; a discharge resistance in the discharge circuit; a switch in said discharge circuit, said switch being biased open and being manually operated to close said discharge circuit, there being means extending between said switch and the selector control switch to permit closure of the discharge circuit switch at the neutral positions of the selector control switch for battery test and discharge purposes; an auxiliary A.-C. circuit closed by the selector control switch at the battery discharge position of said selector control switch; a relay coil in the auxiliary A. C. circuit; a discharge control circuit connected directly in parallel with the discharge resistance, said discharge control circuit including a switch closed by the relay coil in the auxiliary A. C. circuit; a solenoid in series with the A. C. energized switch, said solenoid being associated with the manually operated discharge switch to hold it closed against its normal opening bias and being adapted to release the discharge switch when the battery potential drops below a level predetermined by the opening bias of the discharge switch.

2. In an apparatus for servicing storage batteries, a primary A. C. circuit including a tapped primary winding of a transformer; a battery charging circuit including the secondary of the transformer and a rectifier; a selector control switch in the A. C. circuit for varying the windings used in the primary of the transformer, said selector switch having for battery test and discharge purposes two selector positions whereat the switch is neutral with respect to the primary windings; a normally open battery test and discharge circuit connected across the output of the battery charging circuit; a discharge resistance in the discharge circuit; a switch in said discharge circuit, said switch being biased open and being manually operated to close said discharge circuit, there being means extending between said switch and the selector control switch to permit closure of the discharge circuit switch at the neutral positions of the selector control switch for battery test and discharge purposes; an auxiliary A. C. circuit closed by the selector control switch at the battery discharge position of said selector control switch; a relay coil in the auxiliary A. C. circuit; a primary discharge control circuit including a switch closed by the relay coil in the auxiliary A. C. circuit, a sensitive switch directly in series with the A. C. energized switch, a solenoid associated with the manually operated discharge switch to hold said discharge switch closed against its normal opening bias, said primary control circuit being connected across the battery charging circuit with the control circuit leg from the sensitive switch connecting at the same side of the battery charging circuit to which the discharge switch is connected; a sensitive auxiliary discharge control circuit comprising a relay coil for closing the sensitive switch, said relay coil being connected from a point common to the two switches in the primary control circuit to a point in the discharge circuit between the discharge resistance and the discharge switch.

3. In an apparatus for servicing storage batteries, a primary A. C. circuit including a tapped primary winding of a transformer; a timer switch controlling the A. C. input; a battery charging circuit including the secondary transformer and a rectifier; a selector control switch in the A. C. circuit for varying the windings used in the primary of the transformer, said selector switch having for battery test and discharge purposes two selector positions whereat the switch is neutral with respect to the primary windings; a normally open battery test and discharge circuit connected across the output of the battery charging circuit; a discharge resistance in the discharge circuit; a switch in said discharge circuit, said switch being biased open and being manually operated to close said discharge circuit, there being means extending between said switch and the selector control switch to permit closure of the discharge circuit switch at the neutral positions of the selector control switch for battery test and discharge purposes; an auxiliary A. C. circuit closed by the selector control switch at the battery discharge position of said selector control switch; a relay coil in the auxiliary A. C. circuit; a primary discharge control circuit including a switch closed by the relay coil in the auxiliary A. C. circuit, a sensitive switch directly in series with the A. C. energized switch, a solenoid to hold the manually operated discharge switch closed against its normal opening bias, said primary control circuit being connected across the battery charging circuit with that control circuit leg from the sensitive switch connecting at the same side of the battery charging circuit to which the discharge switch is connected; a sensitive auxiliary discharge control circuit comprising a relay coil for closing the sensitive switch, said relay coil being connected from a point common to the two switches in the primary control circuit to a point in the discharge circuit between the discharge resistance and the discharge switch, and being adapted to release the sensitive control switch when the battery potential drops to a predetermined value.

4. In an apparatus for servicing storage batteries, a primary A. C. circuit including a tapped primary winding of a transformer; a battery charging circuit including the secondary of the transformer and a rectifier; a selector control switch in the A. C. circuit for varying the windings used in the primary of the transformer, said selector switch having for battery test and discharge purposes two selector positions whereat the switch is neutral with respect to the primary windings; a normally open battery test and discharge circuit connected across the output of the battery charging circuit; a discharge resistance in the discharge circuit; a switch in said discharge circuit, said switch being biased open and being manually operated to close said discharge circuit, there being means extending between said switch and the selector control switch to permit closure of the discharge circuit switch at the neutral positions of the selector control switch for battery test and discharge purposes; an auxiliary A. C. circuit closed by the selector control switch at the battery discharge position of said selector control switch; a relay coil in the auxiliary A. C. circuit; a discharge control circuit connected directly in parallel with the discharge resistance, said discharge control circuit including a switch closed by the relay coil in the auxiliary A. C. circuit and a solenoid of a solenoid operated means for holding the manually operated discharge switch closed against its normal opening bias.

ROBERT H. RILEY, Jr.
THOMAS W. HOLLAND.

REFERENCES CITED

The following references are of record in the file of this patent:

UNITED STATES PATENTS

| Number | Name | Date |
| --- | --- | --- |
| 1,681,265 | Sullivan | Aug. 21, 1928 |
| 2,285,620 | Sears | June 9, 1942 |
| 2,296,924 | Heyer et al. | Sept. 29, 1942 |
| 2,347,452 | Amsden | Apr. 25, 1944 |
| 2,366,505 | Fletcher | Jan. 2, 1945 |
| 2,421,828 | Bruney | June 10, 1947 |